Aug. 22, 1933.   R. S. SANFORD   1,923,234

BRAKE

Original Filed Jan. 18, 1928

INVENTOR.
ROY S. SANFORD
BY M.W.McConkey
ATTORNEY

Patented Aug. 22, 1933

1,923,234

UNITED STATES PATENT OFFICE 1,923,234

BRAKE

Roy S. Sanford, South Bend, Ind., assignor to Bendix Brake Company, South Bend, Ind., a Corporation of Illinois Original application January 18, 1928, Serial No. 247,505. Divided and this application December 3, 1930. Serial No. 499,685

6 Claims. (Cl. 188—78)

This invention relates to brakes and more particularly to internal expanding brakes.

The present invention is a division of my pending application Serial No. 247,505, filed January 18, 1928.

The invention broadly comprehends an expansible joint for the articulated ends of the friction elements of a brake and more particularly a joint comprising a floating toggle including links pivoted to the articulated ends of the friction elements and to each other and means associated with the knee of the toggle including an adjustable eccentric positioned on the backing plate to limit movement of the toggle and to spread the friction elements apart to compensate for wear and to adjust the friction elements in proper spaced relation to the braking surface of the drum.

An object of the invention is to provide an effective expansible joint for the articulated ends of friction elements.

Another object of the invention is to provide an expansible joint for the articulated ends of friction elements having associated therewith means for limiting the movement of the joint.

A further object of the invention is to provide an expansible joint for the articulated ends of a friction element having an adjustable stop associated therewith.

Yet a further object of the invention is to provide means connecting the articulated ends of friction elements including a toggle and an eccentric stop coacting with the knee of the toggle.

Other objects of the invention will appear from the following description taken in connection with the drawing which forms a part of this specification, and in which.

Figure 1:
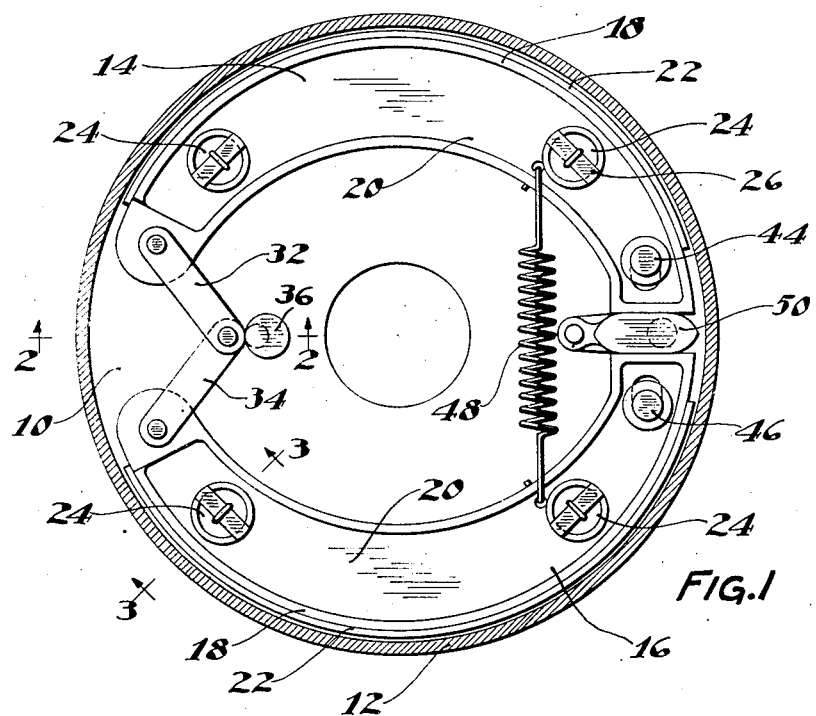
Figure 1 is a sectional view of a brake taken just back of the head of the drum illustrating the friction elements in side elevation and showing the invention as applied.
Figures 2, 3:
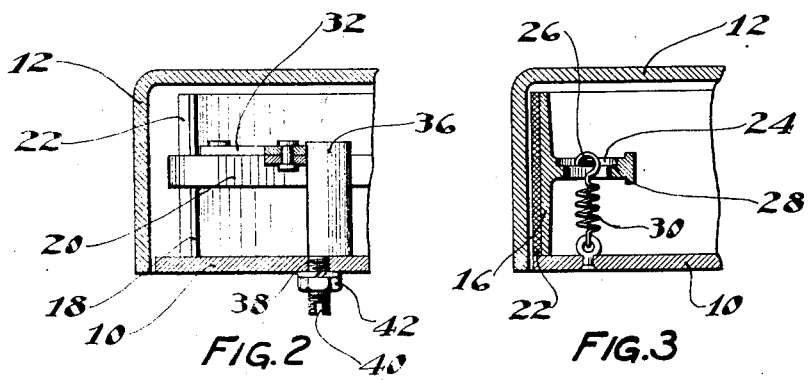
Figure 2 is a sectional view substantially on line 2—2, Figure 1.
Figure 3 is a sectional view substantially on line 3—3, Figure 1.

Referring to the drawing for more specific details of the invention, 10 represents a fixed support such as a backing plate having associated therewith a rotatable drum 12. Positioned for movement on the backing plate are corresponding friction elements or shoes 14 and 16, each comprising a rim 18 having a web 20 and a suitable lining 22 secured to the rim and adaptable for co-operation with the braking surface of the drum.

The friction elements or shoes are supported on the fixed support or backing plate by steady rests. As shown, each of the shoes has in its web adjacent the respective ends of the shoes double diametral bores 24 and positioned diametrally in each of the larger bores is a member 26 having a bearing on a shoulder 28 formed by the double diametral bores. As shown, coil springs 30 connect the members 26 to the fixed support or backing plate 10. These rests retain the friction elements or shoes in any position to which they may be shifted by the whipping action of the drum.

As shown, the articulated ends of the friction elements or shoes 14 and 16 are connected by a floating toggle including links 32 and 34 pivoted to the ends of the friction elements or shoes and to each other. Positioned on the backing plate and arranged in engagement with the knee of the toggle is an eccentric 36. As shown, this eccentric comprises a cylindrical member having positioned eccentrically on one end thereof a threaded stud 38 provided in its free end with a diametral slot 40.

The stud 38 passes through an aperture in the fixed support or backing plate 10 and threaded on the stud is a nut 42 with a suitable lock washer interposed. By loosening the nut 42 and applying a screw driver or other suitable means to the end of the stud 38, the eccentric may be adjusted with relation to the knee of the toggle to regulate the relative position of the friction elements or shoes with respect to the braking surface of the drum.

The separable ends of the friction elements or shoes are apertured to receive suitable anchors 44 and 46 and connected between the friction elements or shoes is a return spring 48 for returning and retaining the friction elements or shoes against the anchors when the brake is in an idle position. Positioned between the separable ends of the friction elements or shoes is a floating operating cam 50 which may be of any preferred type adaptable for operation by any suitable means.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A brake comprising a pair of friction elements having therebetween and connected by a floating expansible articulating joint including a toggle through which one element operates to apply the other, and a stop engaging the toggle and acting through the toggle to position the friction elements.

2. A brake comprising articulated friction elements having connected therebetween a toggle arranged to float and through which one element applies the other and an eccentric engaging the knee of the toggle.

3. A brake comprising a drum, two friction elements having connected therebetween a toggle floatingly arranged in such a manner that both elements anchor on one element when the drum is turning in one direction and on the other element when the drum is turning in the other direction; an adjustable stop member disconnected from and co-operating with the knee of the toggle.

4. A brake comprising a drum, a fixed support, at least two friction elements positioned for movement on the fixed support, a toggle connecting the ends of the friction elements, anchor means for taking the braking torque of both friction elements from one of said elements when the drum is turning in one direction and from the other of said elements when the drum is turning in the other direction, and a stop co-operating with the knee of the toggle adjustably positioned on the fixed support and adapted to straighten the toggle to increase the distance between the shoes.

5. A brake comprising friction elements arranged end to end, floating toggle links pivoted to the adjacent ends of the friction elements and to each other and a stop engaging the knee of the toggle, and brake-applying means and brake-anchorage means engaging the friction elements at their opposite ends.

6. A brake comprising friction elements arranged end to end, floating toggle links pivoted to the adjacent ends of the friction elements and to each other and a stop engaging the knee of the toggle adjustable to straighten the toggle to increase the distance between the friction elements to compensate for wear, and brake-anchorage means engaging the ends of the friction elements opposite the toggle links.

ROY S. SANFORD.